United States Patent

Drieux et al.

[11] Patent Number: 5,971,047
[45] Date of Patent: Oct. 26, 1999

[54] TIRE HAVING BEADS OF SPECIFIED STRUCTURE AND ASSEMBLY OF RIM AND BEARING SUPPORT WITH SAME

[75] Inventors: Jean-Jacques Drieux, Volvic; Olivier Muhlhoff, Clermont-Ferrand, both of France

[73] Assignee: Compagnie Generale des Etablissements Michelin-Michelin & Cie, Clermont-Ferrand, France

[21] Appl. No.: 08/682,548

[22] PCT Filed: Feb. 7, 1995

[86] PCT No.: PCT/EP95/00426

§ 371 Date: Jul. 25, 1996

§ 102(e) Date: Jul. 25, 1996

[87] PCT Pub. No.: WO95/23073

PCT Pub. Date: Aug. 31, 1995

[30] Foreign Application Priority Data

Feb. 28, 1994 [FR] France .................................. 94 02371

[51] Int. Cl.$^6$ ........................... B60B 21/10; B60B 25/04; B60C 3/06; B60C 15/00; B60C 15/024; B60C 17/06

[52] U.S. Cl. ........................... 152/158; 152/456; 152/520; 152/539; 152/544; 152/545; 152/547; 152/550; 152/552; 152/553; 152/375; 152/378 R; 152/379.3; 152/379.4; 152/396; 152/409; 152/410; 152/DIG. 9; 152/DIG. 10

[58] Field of Search ..................... 152/552, 553, 152/550, 539, 544–545, 547, 543, 540–541, 158, 520, 375, 378 R, 379.3, 379.4, 381.3, 381.4, DIG. 9, 456, DIG. 10, 396, 409, 410

[56] References Cited

U.S. PATENT DOCUMENTS

| 903,714 | 11/1908 | Hawley et al. ............... 152/553 X |
| 1,261,754 | 4/1918 | Baker ........................... 152/553 X |
| 1,919,911 | 7/1933 | Shoemaker . | |
| 2,868,258 | 1/1959 | Powers . | |
| 3,301,303 | 1/1967 | Travers . | |
| 4,580,610 | 4/1986 | Jackson . | |

FOREIGN PATENT DOCUMENTS

| 1327810 | 9/1963 | France . |
| 2211354 | 7/1974 | France . |
| 2713557 | 6/1995 | France . |
| 71465 | 6/1975 | Luxembourg . |
| 767378 | 1/1957 | United Kingdom . |

Primary Examiner—Adrienne Johnstone
Attorney, Agent, or Firm—Baker & Botts, L.L.P.

[57] ABSTRACT

A tire has a carcass reinforcement (1) which, when viewed in meridian section, is wound in each bead B about a bead wire (2) coated with a rubber mix, passing from the heel to the toe of the bead B, the upturn (10) being located in a profile (3) of rubber mix in the form of a wedge defined by two sides (31 and 32) coming from an apex A located beneath the section of the coated bead wire (2). Advantageously the upturn (10) surrounds in its entirety the contour of the profile (3), forming either a first radially inner side (32), a lateral side (30), and a final radially outer side (31) or a first radially outer side (31), a lateral side (30), and a final radially inner side (32). The tire may form with different rims J high-performance assemblies in the event of travel at low or zero pressure, permitting simple mounting of the tires and optionally of bearing supports S for the tire tread on the rims J.

25 Claims, 10 Drawing Sheets

TIRE HAVING BEADS OF SPECIFIED STRUCTURE AND ASSEMBLY OF RIM AND BEARING SUPPORT WITH SAME

BACKGROUND OF THE INVENTION

The present invention relates to a tire with radial carcass reinforcement, and more particularly to the structure of the beads of the tire. It also relates to an assembly, formed by a tire and a rim, which rim is either monobloc with seats which may or may not be inclined, or in several sections, some of which are mobile, and possibly provided with a bearing support which may or may not be removable.

A tire with radial carcass reinforcement usually comprises, in known manner, a reinforcing bead wire in each bead, around which bead wire the carcass reinforcement is anchored by winding, forming an upturn. The characteristics of the bead wire, taken in combination with the meridian profile of the radially inner face of the bead and the meridian profile of the corresponding rim seat, ensure what is called the clamping of the bead on the rim. The clamping produces a certain compression of the portion of the bead between the bead wire and the bead seat, the clamping generally being brought about by a difference in the angles of the bead seat and the rim seat respectively, and/or by a difference in the diameters of said seats.

When such a tire is used on a rim having flat or inclined seats, with angles which may vary from 0° to 30°, when the rim comprises a flat rim base and a plurality of mobile parts, when the rim is monobloc with a mounting groove, when the seats are inclined towards the inside or towards the outside, the clamping value of the beads on the rim seats, which clamping is necessary for solving the problems relating to the rotation on rim at the normal use pressure of the tire and for maintaining good lateral strength of the beads, becomes so great that difficulties are encountered in mounting such tires on their rims in practically all cases, even sometimes with the use of mounting presses.

Although these presses are common tools which are usual for tire manufacturers or motor vehicle manufacturers, they do not form part of the usual equipment of the garage mechanic who is usually approached when there is a problem relating to the tire, for instance a passenger-coach tire.

SUMMARY OF THE INVENTION

In order to facilitate the mounting and the demounting of a tire on its mounting rim while remedying the problems of rotation on the rim, precise location of the beads on the rim seats and fatigue strength of said beads, the invention proposes a tire, at least one bead of which has a structure permitting modification of the clamping of the bead as a function of the tension of the carcass reinforcement and in particular reinforcement thereof when the inflation pressure increases to its nominal value.

According to the invention, a tire with radial carcass reinforcement, wound in each bead on at least one bead wire to form an upturn, is characterized in that, when mounted on rim and inflated to its service pressure, its carcass reinforcement, viewed in meridian section, is wound in at least one bead about the bead wire coated with a rubber mix, passing from the heel to the toe of said bead, the upturn extending in a profile made of rubber mix in the form of a wedge defined by two sides coming from an apex located beneath the section of the coated bead wire, the radially outer side forming, with a line parallel to the axis of rotation passing through said apex, an acute $\phi_1$ angle open radially towards the outside, and the radially inner side forming with said parallel line an acute angle $\phi_2$ open radially towards the inside, the rubber mix forming the profile, axially adjacent to the bead wire, having a Shore A hardness greater than the Shore A hardness(es) of the rubber mixes located axially and radially above the bead wire and the profile.

The outer contour of a tire bead is generally defined by three basic walls:

a first rectilinear and/or curved wall, intended to come into contact and to bear laterally with and on the wall, perpendicular or virtually perpendicular to the axis of rotation, of an element foreign to the tire, an element which in the great majority of cases is a rim flange, axially on the outside of the rim, but which in certain cases is located axially on the inside, as described in U.S. Pat. No. 5,634,993 and French publication No. 2,713,558, said first wall being joined axially, on the inside or on the outside, to a wall called a bead seat, intended to come into contact and bear with and on the rim seat; said bead seat may be inclined or not inclined with respect to the direction parallel to the axis of rotation, which inclination may be positive or negative, and variable or not variable, the bead seat then being connected, on the side opposite the first wall, to a third generally curved wall of generally perpendicular direction to the axis of rotation, which wall is intended to come into contact, depending on the case, with the gas for inflating the tire or with the surrounding atmosphere, and the radially inner end of the third wall may possibly bear laterally on a stop which may be a protuberance or protrusion arranged on the rim seat.

In known, everyday language, the portion of the bead defined simultaneously by the first wall of the contour of the bead and by the bead seat is called the heel of the bead, whereas the portion defined simultaneously by the third wall and by the bead seat is called the toe of the bead.

"Wedge" is intended to mean a sector defined by two rectilinear or curvilinear sides or radii, starting from the apex or center of the sector, the two respective ends of which define a third side, opposite the center, of any shape.

Preferably the angles $\phi_1$ and $\phi_2$ which are formed respectively by the radially outer and inner sides of the profile or wedge with a line parallel to the axis of rotation are respectively between 20° and 70° and between 0° and 30°.

Advantageously, the rubber mix forming the profile or wedge, axially adjacent to the bead wire, will have a Shore A hardness of at least 65 (measured according to ASTM standard D.67549T).

The invention has the advantage of being able to realize, in the case of passenger-coach tires, beads having little or no initial clamping, the radially inner face of the bead or seat being substantially dimensionally identical to the face opposite the seat of the mounting rim of the tire. "Dimensionally identical" is intended to mean that the bead seat has the same dimensions at all points, with respect to the three conventional coordinate axes, as the portion opposite the rim seat.

The coated bead wire, which has in meridian section a substantially circular section, is advantageously capable of being moved in rotation about its mean axis, and may be a bead wire which is rigid in torsion, as is a bead wire obtained by winding a wire of quadrilateral section or as is a bead wire obtained by winding a metal band of straight or curved meridian section, this coated bead wire which is rigid in torsion not being glued to the rest of the bead. Another variant consists in coating the bead wire with a thin layer of vulcanized mix having a Shore A hardness of at most 35.

"Mean axis" of a bead wire is intended to mean the circle which is the geometric locus of the centers of gravity of the meridian sections of said bead wire.

Preferably, said bead wire may be a bead wire of braided type, that is to say a bead wire formed of a core around which are wound one or several cords or cables on one or more layers. As is known per se, the layer(s) of cord(s) or cable(s) are capable of turning about the core.

The bead wire reinforcing the bead is surmounted radially on the outside by a substantially triangular profile made of a rubber mix preferably having a Shore A hardness of less than 50. The space, firstly axially adjacent to the profile radially surmounting the bead wire, and secondly radially adjacent to the profile or wedge axially next to the bead wire, is filled by a third profile of rubber mix substantially of triangular shape, said mix also having a Shore hardness of less than 50.

The carcass reinforcement upturn may be substantially rectilinear and have a length substantially equal to the length of the sides of the rubber profile in the form of a wedge. It may be located on the inside of the profile, one part of the profile being radially above the upturn and one part of the profile being below the upturn. This latter may form the radially inner side of the rubber profile. Advantageously, the upturn will form the radially outer side of the profile or wedge, given that it is necessary to acknowledge by convention that the upturn is also, in the above two cases, considered as extending within the profile.

Whether the initial clamping on the rim be zero or of a given value, whether the upturn be located within the profile or wedge, on the radially outer side, or on the inner side of said profile, the axial displacement of the anchoring bead wire of the carcass reinforcement, which may result from the tension of said reinforcement, which tension is due, for instance, to the inflation pressure of the tire, makes possible, in combination with the axial disposition of the rubber profile reinforced by the upturn, to obtain clamping of the toe of the bead on the rim seat. The value of this clamping increases as a function of the tension force to which the carcass reinforcement is subjected, and may become very great in the case of high tension, for instance when one of the sidewalls of the tire is placed under great tension by a transverse force.

A tire in which the carcass reinforcement is wound about a bead wire, passing from the toe to the heel of the bead and such that the upturn rests partially and radially on the outside on a second bead wire located axially on the outside, is known from U.S. Pat. No. 3,301,303. This second bead wire, in combination with the meridian profile of the upturn, is necessary in order to avoid the unwinding of the carcass reinforcement, in particular in the case of beads damaged by heat. The section of the second bead wire is radially incompressible, and does not permit radial forces to be transmitted to the rim seat.

Preferably, the carcass reinforcement upturn will have a length such that it will be in contact with the total perimeter of the profile or wedge; it will thus form the two radially outer and inner sides of the rubber profile and the side opposite the apex or center of the profile, and its end will be located axially beyond the point of intersection of the two outer and inner sides. The part of the upturn immediately adjacent to that part of said upturn which is wound around the bead wire may in the first instance form the radially outer edge of the profile or wedge and then the side opposite the apex of said profile, and then finally the radially inner side of said profile, ending beyond the junction point of the two outer and inner sides. It may also form firstly the radially inner side of the profile or wedge, then the side opposite the apex of said profile, and then finally the radially outer side of said profile, ending in the same manner as previously. Advantageously, the end of the carcass reinforcement upturn will be radially further from the axis of rotation than the center of gravity of the section of the coated bead wire.

The invention applies whatever the inclination of the bead seat, but it is particularly beneficial in the case of seats inclined towards the outside of the tire, the toes of the bead then being on the outside.

DESCRIPTION OF THE DRAWINGS

The invention will be better understood with reference to the drawings appended to the description, which illustrate non-limiting examples of embodiment of tires according to the invention and which, when associated with suitable rims, form high-performance tire-rim assemblies. In these drawings.

DESCRIPTION OF PREFERRED EMBODIMENTS

Figure 1:
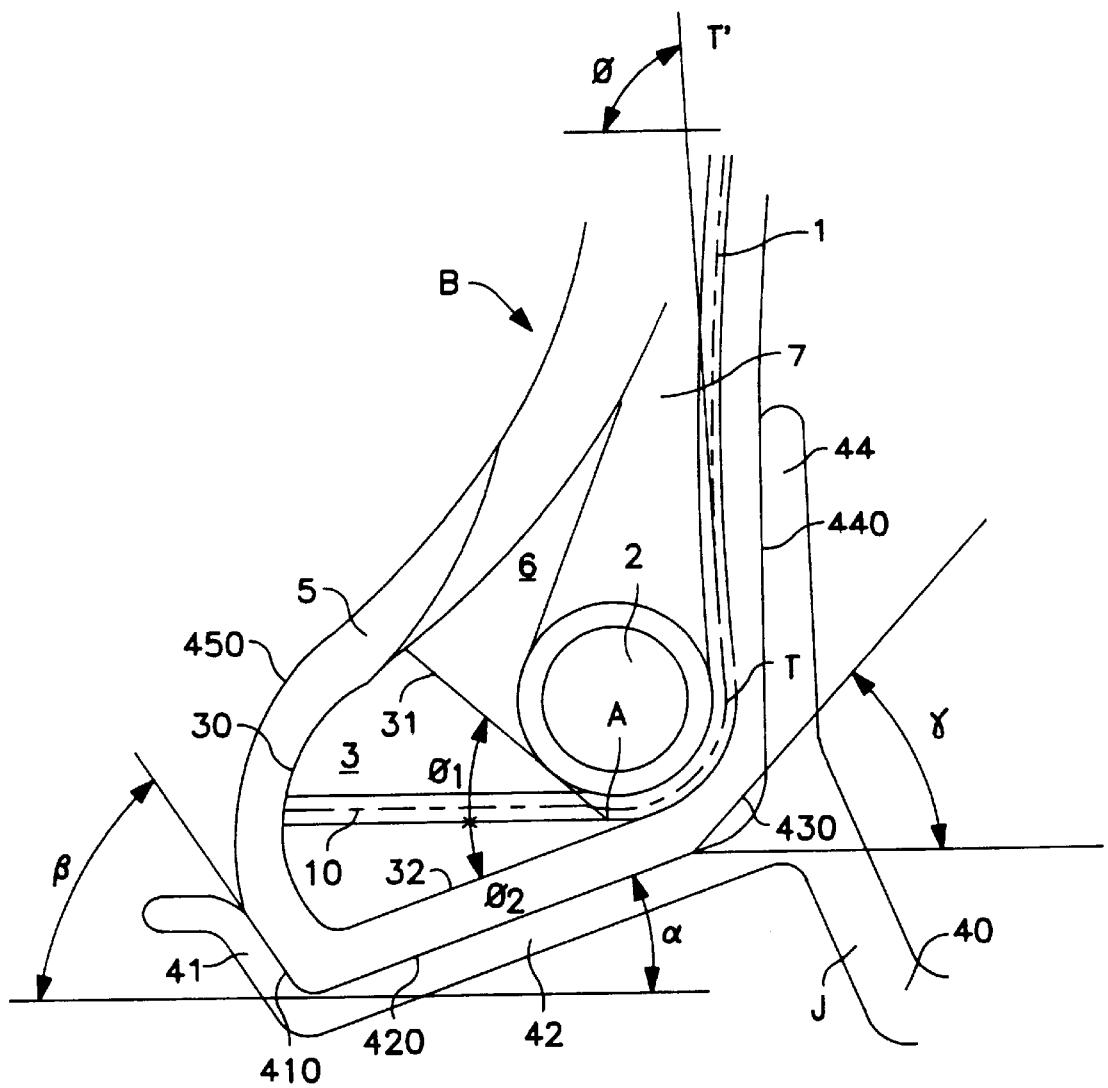
FIGS. 1, 1A, and 1B show diagrams of a tire bead, in accordance with a first variant according to the invention and mounted on a rim seat said to be inclined towards the outside.
Figure 1A:
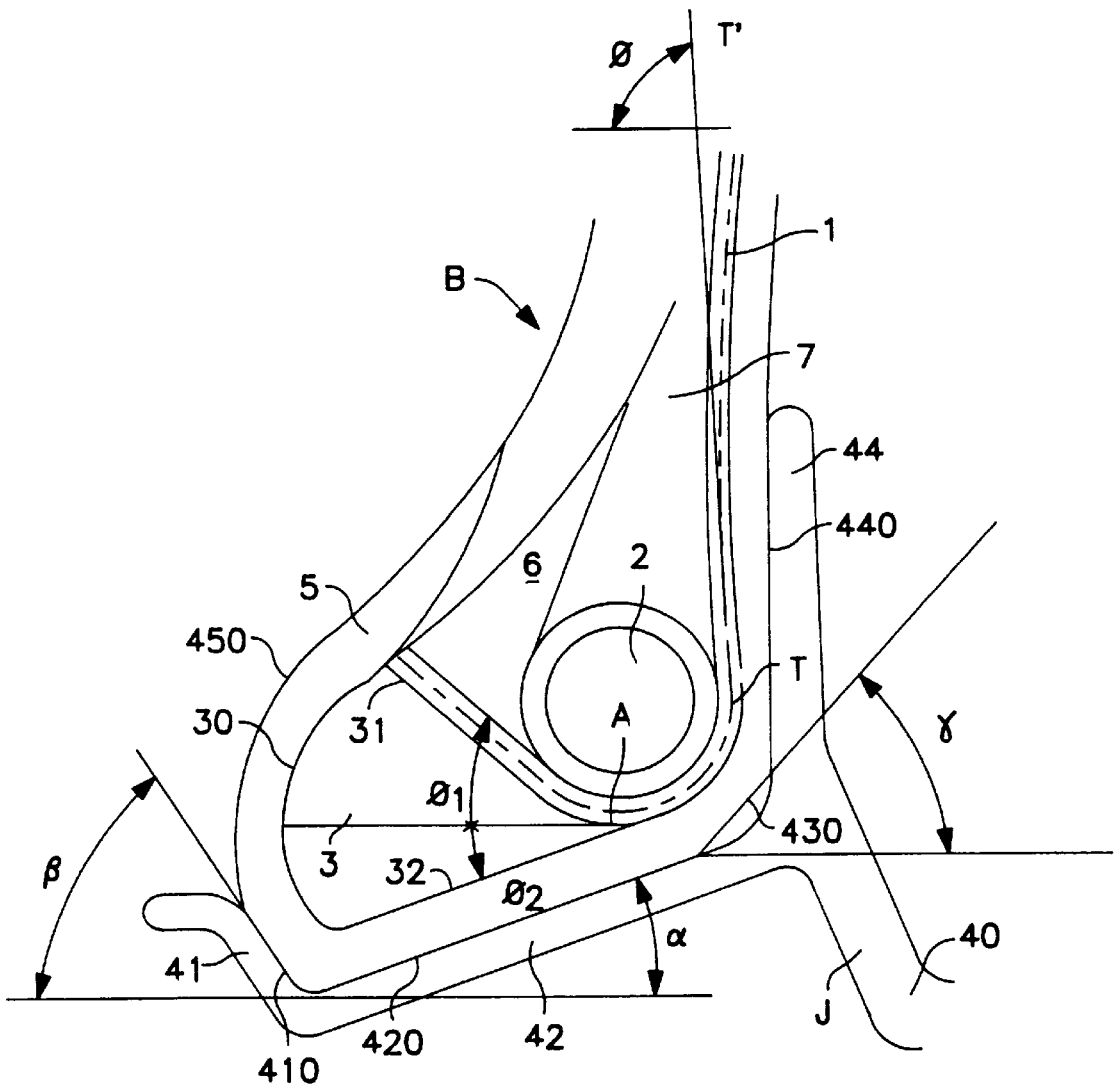
Figure 1B:
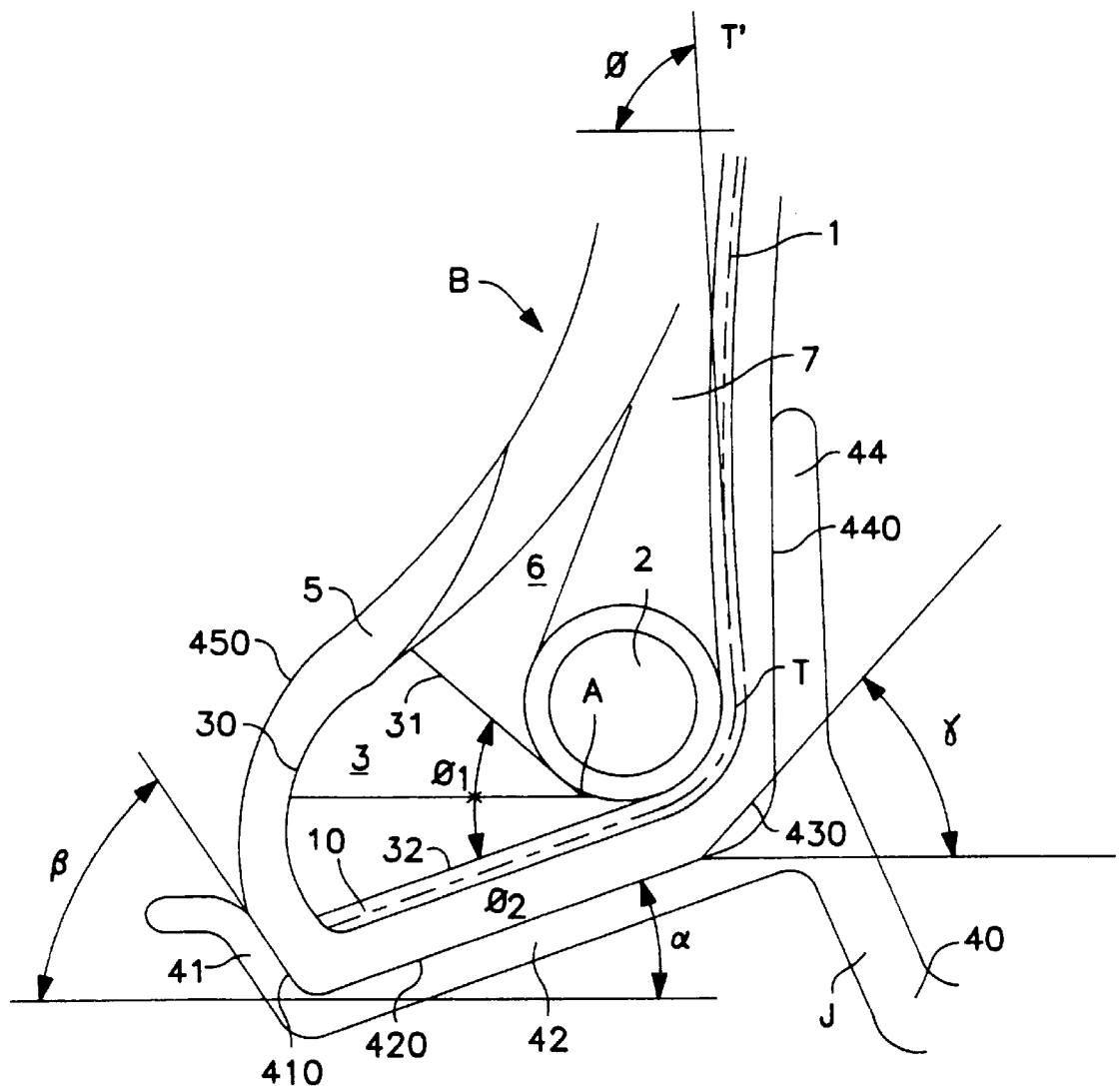

The bead B of the passenger-coach tire, shown in FIG. 1 and in accordance with the invention, comprises a coated bead wire 2 of the "braided" type, around which a carcass reinforcement 1 is wound which in the example illustrated is composed of a single ply of textile cables, forming an upturn 10. The meridian profile of the mean fiber of the carcass reinforcement 1 (in dashes) is at a tangent to the coated bead wire 2 at a point T, and said tangent (TT') forms with a line parallel to the axis of rotation of the tire an angle φ, open radially and axially towards the outside, of 85°. The contour of the bead B comprises, axially on the inside, a wall 440 substantially perpendicular to the axis of rotation and bearing laterally on the axially inner flange 44 of the mounting rim J. This rim is a rim as described in U.S. Pat. No. 5,634,993, that is to say, having the distinctive feature of having at least one rim seat inclined towards the outside, said seat being extended axially on the inside either by a rim flange or by the rim base on which a bearing support for the tread is placed, one lateral face of said support being used as a rim flange. The seat is extended axially on the outside by a protrusion or hump of low height. The wall 440 of the bead B is extended axially on the outside by a frustoconical generatrix 430, forming an angle γ of 45° which is open axially towards the inside and radially towards the outside with a line parallel to the axis of rotation. The generatrix 430 is itself extended axially on the outside by a second frustoconical generatrix 420 having a bead seat forming an angle α of 15° open axially towards the inside and radially towards the outside with the direction of the axis of rotation. The generatrix is said to be inclined towards the outside, its axially outer end being on a circle of diameter less than the diameter of the circle on which its axially inner end is located. A frustoconical generatrix 410, extending the generatrix 420 axially on the outside and forming an angle β of 45° open axially and radially towards the outside with the direction of the axis of rotation, completes the contour of the base of the bead B. The wall 450, which is curved in the example described and is of substantially perpendicular general orientation to the direction of the axis of rotation of the rim, completes the contour of the bead B. Whereas the generatrix 420 will bear on the rim seat 42, inclined towards the outside, the generatrix 410 will bear on the axially inner wall of the protrusion or hump 41 of the rim J, inclined by the same angle β as the generatrix 410. The portion of the bead adjacent to the wall 440 and to the generatrix 420 forms, viewed in meridian section, the heel of the bead B. The portion of the bead adjacent to the generatrix 420, to the generatrix 410 and partially to the wall 450 forms the toe of the bead B. The carcass reinforcement 1 is wound about the coated bead wire 2, passing from the heel to the toe of the bead B, to form an upturn 10 which is substantially rectilinear and located within a profile 3, arranged axially on the outside of the anchoring bead wire 2 of the carcass reinforcement 1. This profile 3 is in the form of a substantially circular sector with an apex or center A located radially below the bead wire 2, two sides or radii 31 and 32 starting from said apex A, and a third side 30, opposite the apex A. The side or radius 31 radially on the outside forms an angle $\phi_1$ of 45° with a line parallel to the axis of rotation, whereas the radially inner side or radius 32 forms an angle $\phi_2$ of 15° with the same parallel line. This profile 3, which is completed axially on the outside by the substantially circular side 30, is made of a rubber mix having a Shore A hardness of 94 in the vulcanized state. The coated bead wire 2 is surmounted radially on the outside by a profile 7 of rubber mix having a Shore A hardness of 37. Radially on the outside of the profile 3 and axially on the outside of said profile 7 there is located a third profile 6 made of rubber mix having a Shore A hardness equal to that of the profile 7 and therefor significantly less than the hardness of the mix of the profile 3, which makes it possible, upon an increase in tension of the carcass reinforcement, to facilitate the axial displacement of the braided bead wire 2 towards the outside of the bead B and thus to create a compression of the profile 3 and self-clamping of the toe of the bead on the mounting rim J, whereas, in the case described, the initial clamping of the bead B on said rim is zero. The bead B is completed by the protector 5. FIGS. 1A and 1B are similar to FIG. 1 but show the upturn 10 forming the radially outer side or radius 31 and forming the inner side or radius 32, respectively.

Figure 2:
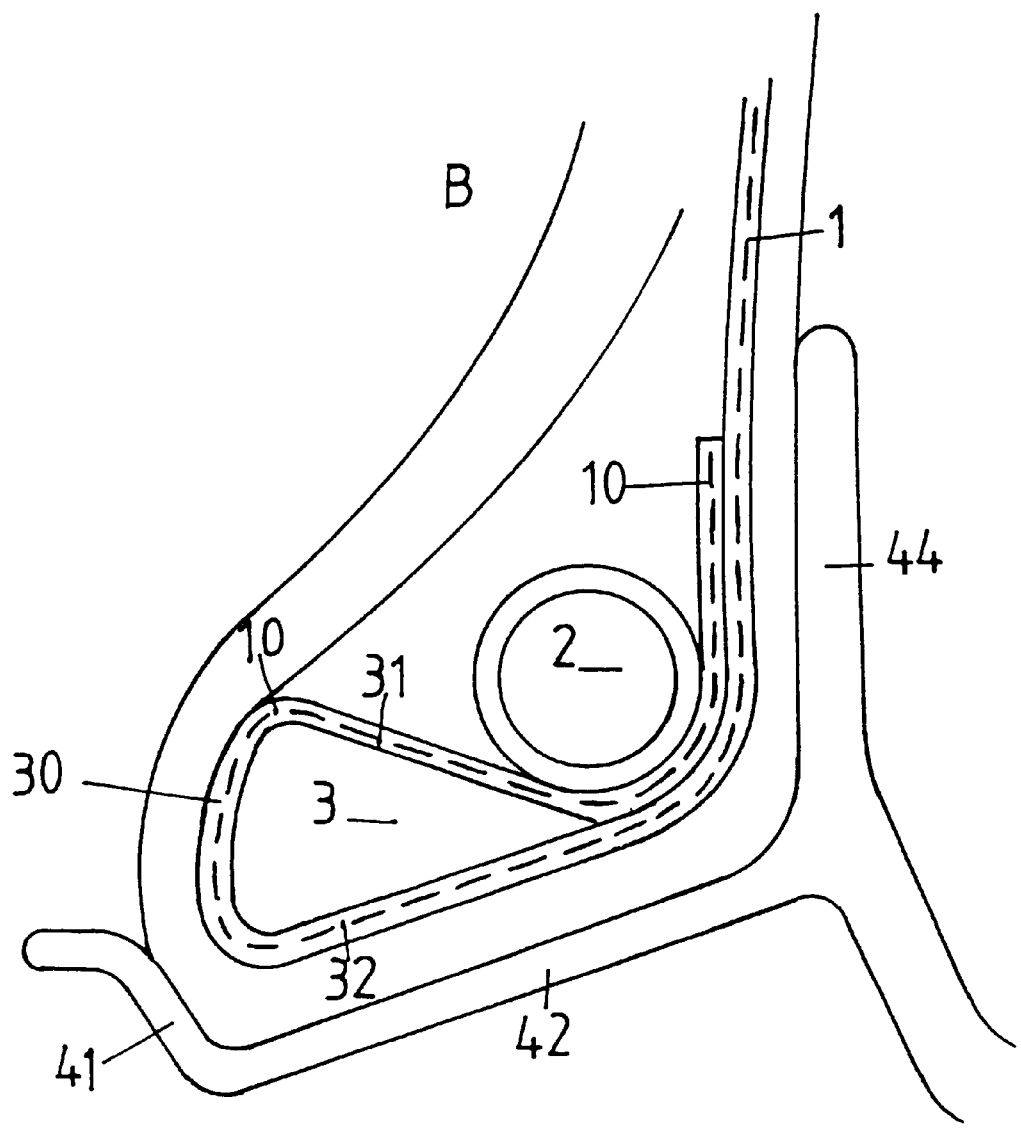
FIG. 2 shows a diagram of a tire bead, in accordance with a second variant according to the invention and mounted on a seat identical to the previous one.

FIG. 2 shows the variant of a bead according to the invention, this variant being characterized by the fact that the upturn 10 of the carcass reinforcement 1 surrounds in its entirety the contour of the profile 3, forming firstly the radially inner side 32 of the profile 3, secondly the lateral side 30 axially on the outside of said profile and finally the radially outer edge 31 of the same profile, winding again around the bead wire 2, the end of said upturn being located radially above the bead wire 2. The end is thus advantageously shielded from the usual deformations to which the ends of carcass reinforcement upturns are generally subjected, which deformations lead to poor fatigue strength of the beads.

The assembly, formed by a tire according to the invention and a rim, may comprise a rim with two identical rim seats, the axially inner ends of which are located on circles of diameters greater than the diameters of the circles on which are located the axially outer ends, such seats being shown in FIGS. 1 and 2. The tire-rim assembly may, in accordance with another variant, comprise a rim having a first seat as defined above and said to be inclined towards the outside and a second seat said to be inclined towards the inside, the axially inner end of said seat being on a circle of diameter less than the diameter of the circle on which the axially outer end is located. The tire of the assembly obviously includes beads of a shape adapted to the shape of the rim seats.

The tire-rim assembly may also comprise a rim, the two seats 42 of which are inclined towards the inside, the axially inner end of each seat 42 being located on a circle of diameter less than the diameter of the circle on which the axially outer end is located, said seats 42 being joined axially on the outside to two flanges 44.

Figure 3:
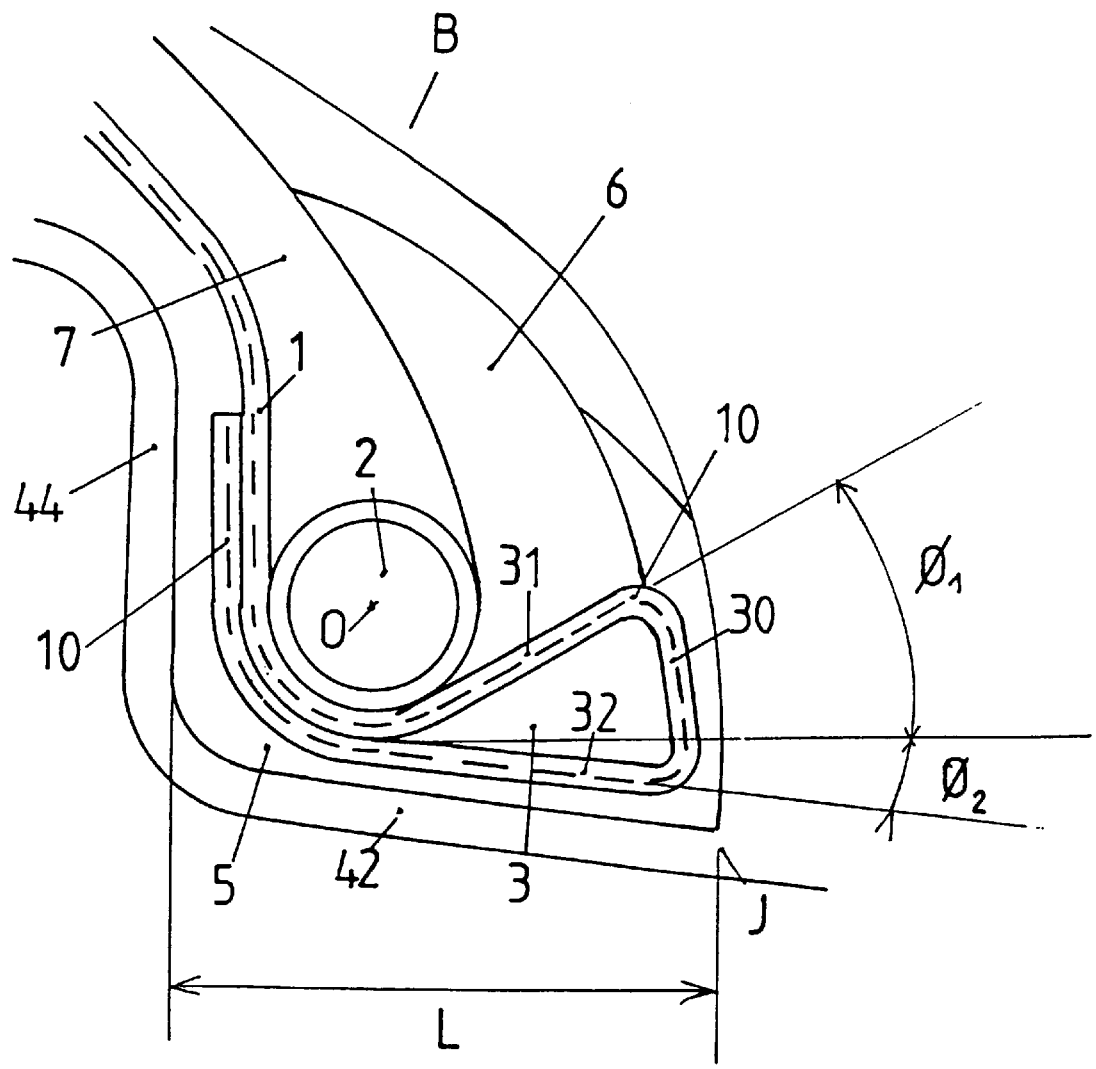
FIG. 3 shows a tire bead in accordance with a third variant according to the invention and mounted on a rim seat inclined towards the inside at an angle of inclination of 5°±1°.

FIG. 3 shows a bead B, in accordance with a third variant according to the invention, suitable for mounting on a rim seat 42, inclined towards the inside and joined axially on the outside to a rim flange 44. The heel of the bead B is then located axially on the outside, whereas the toe of said bead is axially on the inside, the rim flange or flanges 44 then being located axially on the outside of the rim J. In the example illustrated, the center of the meridian section of the coated bead wire 2 is located in the axially outer part of the bead B, or if the width of the bead B is called L, said center 0 is separated from the inner wall of the rim flange 44 by a distance of at most half L. Axially on the inside there is located the profile 3 of rubber mix, which is of the same shape as the profiles described previously, although the angles which the sides or radii 31 and 32 form have been adapted to the bead in question. The radially outer side 31 forms an angle $\phi_1$ of 30° with a line parallel to the axis of rotation, whereas the radially inner side 32 forms an angle $\phi_2$ of 5° with the same parallel line. The profile 3 is made, as previously, of vulcanized rubber mix having a Shore A hardness of 94. The profiles 6 and 7 of rubber mix which, respectively, are located radially on the outside of the profile 3 and radially n the outside of the bead wire 2 are similar to the profiles 6 and 7 described in that part of the description which relates to FIGS. 1 and 2. In this example, the meridian profile of the carcass reinforcement upturn is different from the profiles described previously; in fact, the upturn 10 of the carcass reinforcement 1 surrounds in its entirety the contour of the profile 3, forming firstly the radially outer side 31 of the profile 3, secondly, the axially outer lateral side 30 of said profile and finally the radially inner side 32 of the same profile, and winds again around the bead wire 2, the end of said upturn still being located radially above the bead wire 2.

Figure 4:
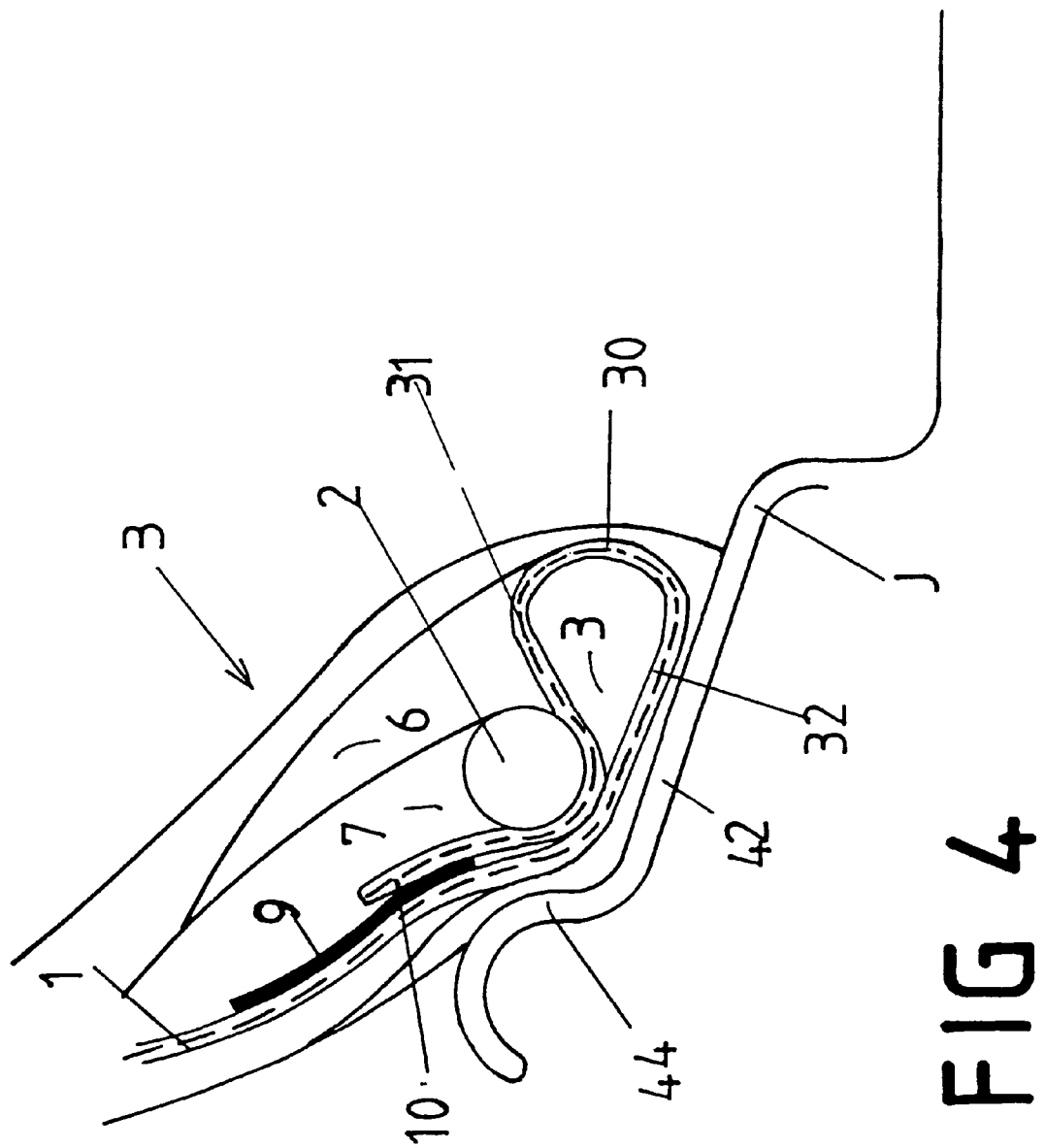
FIG. 4 shows a diagram of an assembly formed by a tire and a so-called monobloc rim having seats inclined at 15°±1°.

FIG. 4 shows an assembly formed by a tire according to the invention, mounted on its service rim. The rim J is a monobloc rim comprising rim seats 42 which are inclined towards the inside with respect to the direction of the axis of rotation of the assembly and form an angle of 15°±1° with said direction, curved A flanges 44 axially on the outside of said seats and an assembly groove, in accordance with current standards. In each bead B of the tire, the upturn 10 of the carcass reinforcement 1 surrounds the profile 3 in its entirety, passing from the heel to the toe of the bead, the end of the upturn 10 being located radially above the metal bead wire 2. As in the case of FIG. 2, the upturn 10 forms firstly the radially inner side 32 of the profile 3, secondly the lateral side 30 axially on the inside of said profile and finally the side radially on the outside 31 of the same profile, and then winds round the bead wire 2 again, this upturn profile making it possible to have the end of said upturn axially on the inside of the meridian profile of the carcass reinforcement and thus to improve the fatigue strength of the beads. Said strength may be improved still further by the presence between the carcass reinforcement and its upturn of an additional strengthening reinforcement 9, formed of textile or metallic cables, oriented with respect to the circumferential direction by a slight angle, which may be between 0° and 45°.

The tire/rim assembly may advantageously comprise a rim J having firstly a first seat 42', as defined above, and said to be inclined towards the outside and secondly a second seat 42" said to be inclined towards the inside, the tire of said assembly obviously comprising beads of a shape adapted to the shape of the rim seats 42' and 42". The two seats may then be of equal or unequal diameters.

Figure 5:
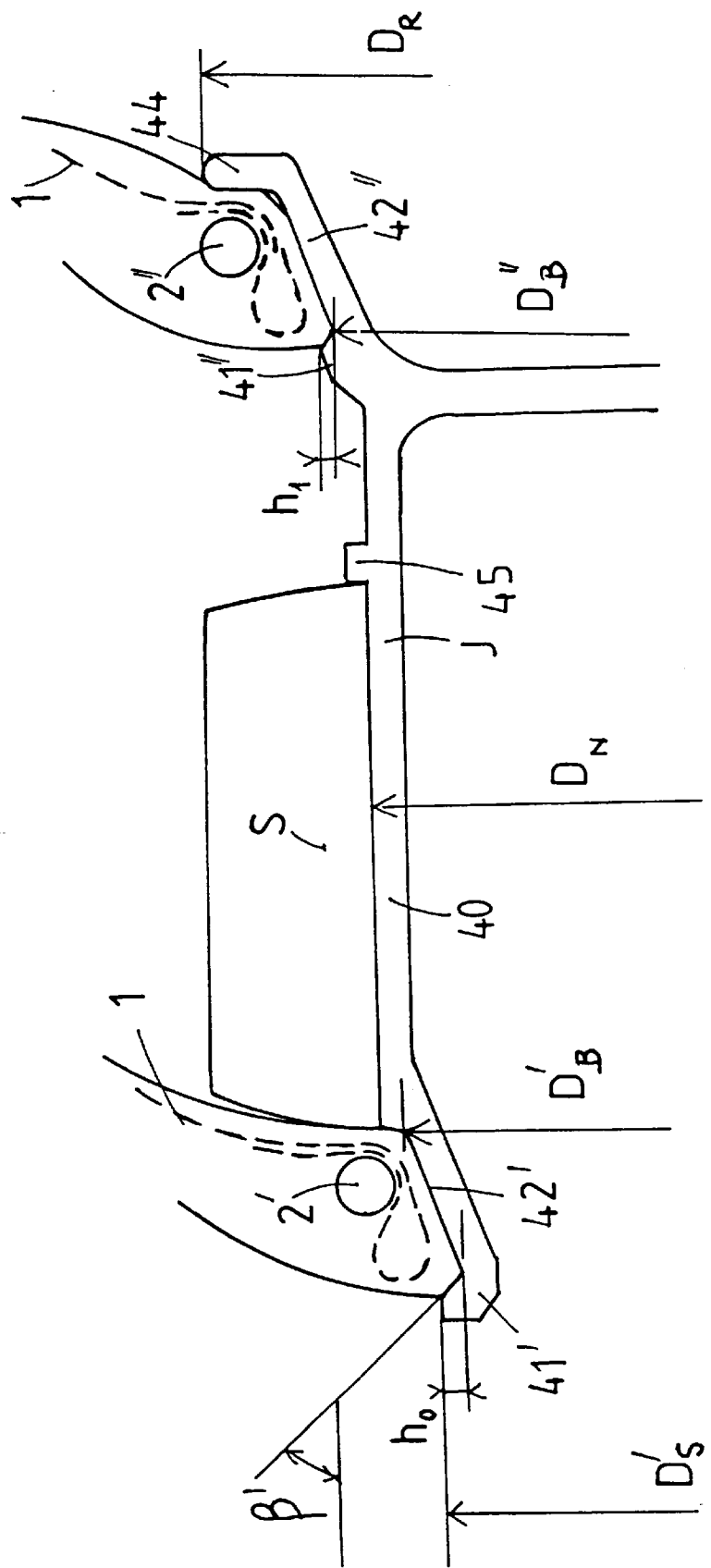
FIG. 5 shows a diagram of an assembly formed by a tire, a monobloc rim having asymmetrical seats and a bearing support for the tread.

The rim J, which forms with a tire, according to the invention, the assembly shown in FIG. 5, is a rim such as is described, for example, in U.S. Pat. No. 5,787,950, and more precisely in the passage of the description of said patent relating to FIG. 3 of the appended drawings. The rim J comprises a first rim seat 42', the axially outer end of which is on a circle of diameter less than the diameter of the circle on which the axially inner end is located, and a second rim seat 42", the axially outer end of which is located on a circle of diameter greater than the diameter on which the axially inner end is located. The two seats 42' and 42" have frustoconical generatrices forming with the axis of rotation an angle which is identical for the two generatrices and which is equal to 6°. The first seat 42' is extended axially on the outside by a protrusion or hump 41' of low height $h_0$, equal to 3.5 mm, and having an inner frustoconical wall forming with the axis of rotation of the rim an angle $\beta'$ of 45°. Axially on the inside, the first rim seat 42" is joined to a rim base 40 by means of a frustoconical generatrix, the diameter $D_N$ of said cylindrical rim base being slightly greater than the diameter $D'_B$ of the axially inner end of the seat 42', which diameter is itself greater than the diameter $D'_S$ of the outer protrusion 41'. The second rim seat 42" is extended axially on the outside by a rim flange 44 having an inner wall perpendicular to the axis of rotation and having a radially outer end, the diameter $D_R$ of which is the maximum diameter of the rim. Axially on the inside, the second rim seat 42" is extended by a protuberance 41", the height $h_1$ of which is similar to the height of the protrusions or humps normally used on current standardized rims. The two rim seats 42' and 42", which are dissymmetrical by the directions of inclination of their generatrices, are also dissymmetrical by their diameters, the diameter $D''_B$, of the axially inner end of the second rim seat 42" being greater than the diameter $D'_B$, of the axially inner end of the first rim seat 42'. The assembly is completed by a bearing support S for the tread, held in the axial position firstly by one of the beads B of the tire mounted on its rim J and secondly by a protuberance 45 located on the rim base 40, the lateral face of the bearing support being considered as the equivalent of the wall of a rim flange axially on the inside of the rim seat. The beads B of the tire are then adapted to such a rim configuration: in the bead B intended to be mounted on the first rim seat 42', the carcass reinforcement 1 is wound about the coated bead wire 2', according to the invention, passing axially from the inside to the outside, since, in this bead, the heel is on the inside, the wall of the rim flange being advantageously replaced by the equivalent wall of the bearing support S; in the bead B intended to be mounted on the second rim seat 42", the carcass reinforcement 1 is wound round the coated bead wire 2", passing from the outside to the inside since the heel of said bead is then axially on the outside.

Figure 6:
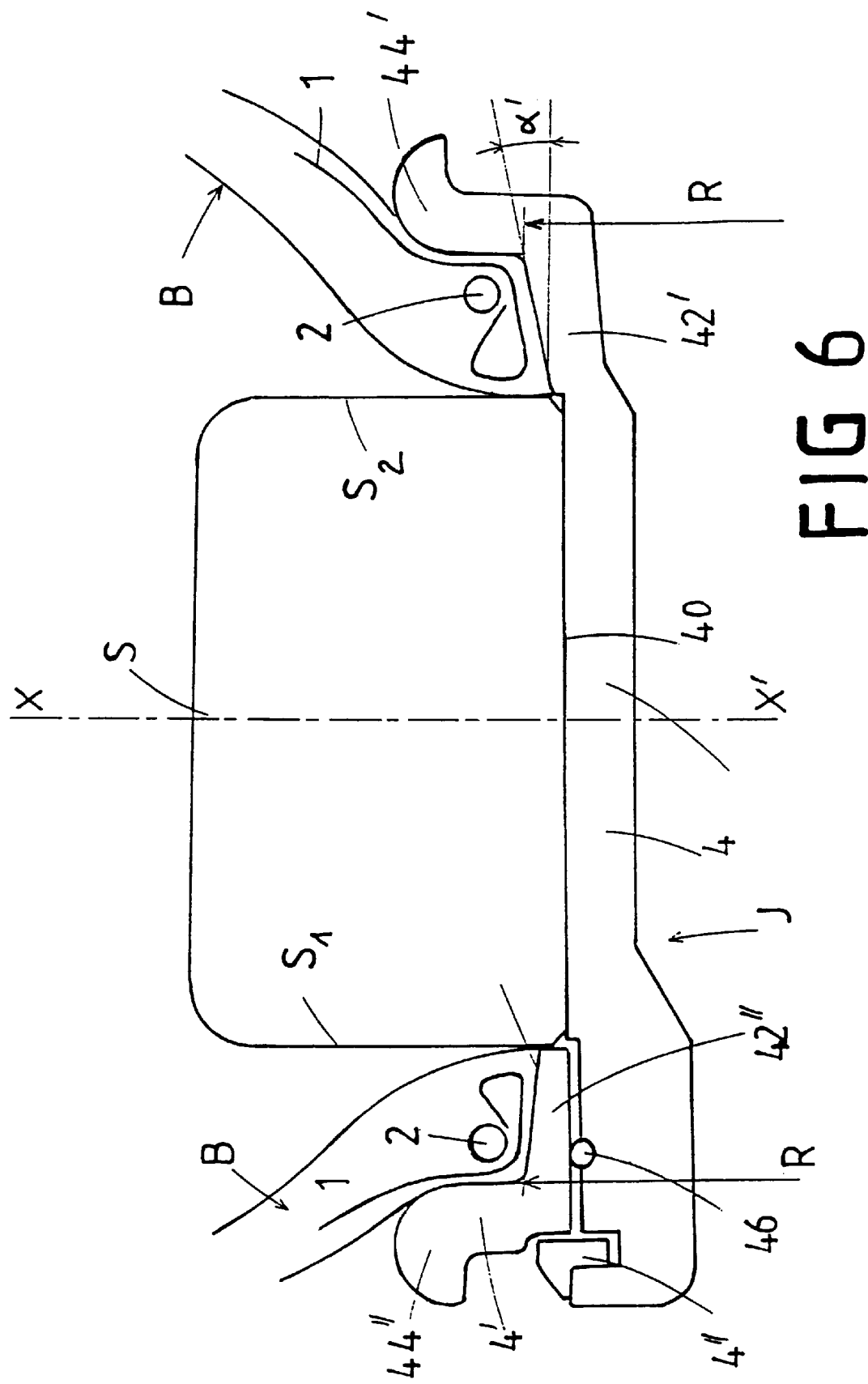
FIG. 6 shows a diagram of an assembly formed by a tire according to the invention, a so-called three-part rim and a bearing support for the tread.

FIG. 6 shows another example of an assembly composed of a tire according to the invention, a rim J and a bearing support S. The rim J comprises three metal parts: a first part 4 formed primarily of the rim base 40, connected on one hand to a first rim seat 42' and axially on the outside to a rim flange 44' integral with the seat 42', and comprising on the other hand the part intended to receive the second metal part 4' of the rim J. Said demountable part 4' is formed by a rim seat 42" and a rim flange 44". The third part is the locking ring 4". The rim seats 42' and 42" have respectively generatrices which are symmetrical with respect to the equatorial plane of the assembly and frustoconical, forming with the direction of the axis of rotation an angle $\alpha'$ of 5° open radially and axially on the outside. The two rim flanges 44' and 44" being axially on the outside of the two rim seats 42' and 42", the carcass reinforcement 1, in each bead B, winds around the bead wire 2, passing from the outside to the inside and then coming back beneath the bead wire 2, after having surrounded a profile 3 of rubber mix in the form of a wedge, as in the examples already described. The assembly is advantageously completed in this example by a bearing support S, the meridian section of which is substantially rectangular and the radially inner face of which rests on the cylindrical face of the rim base 40. The lateral sides $S_1$ and $S_2$, which are axially distant by the maximum axial width of the support S, are in contact with the axially inner walls of the toes of the beads B, and thus avoid the axial displacement of the beads B of the tire towards the inside in the case of travel at low or zero pressure.

In the example described above and shown in FIG. 6, it is necessary to place between the radially inner cylindrical face of the mobile rim seat 42" and the radially outer face of the part of the corresponding rim base 40 a gasket 46 made of vulcanized rubber, this gasket being placed in the half-grooves provided for this purpose.

Figure 7:
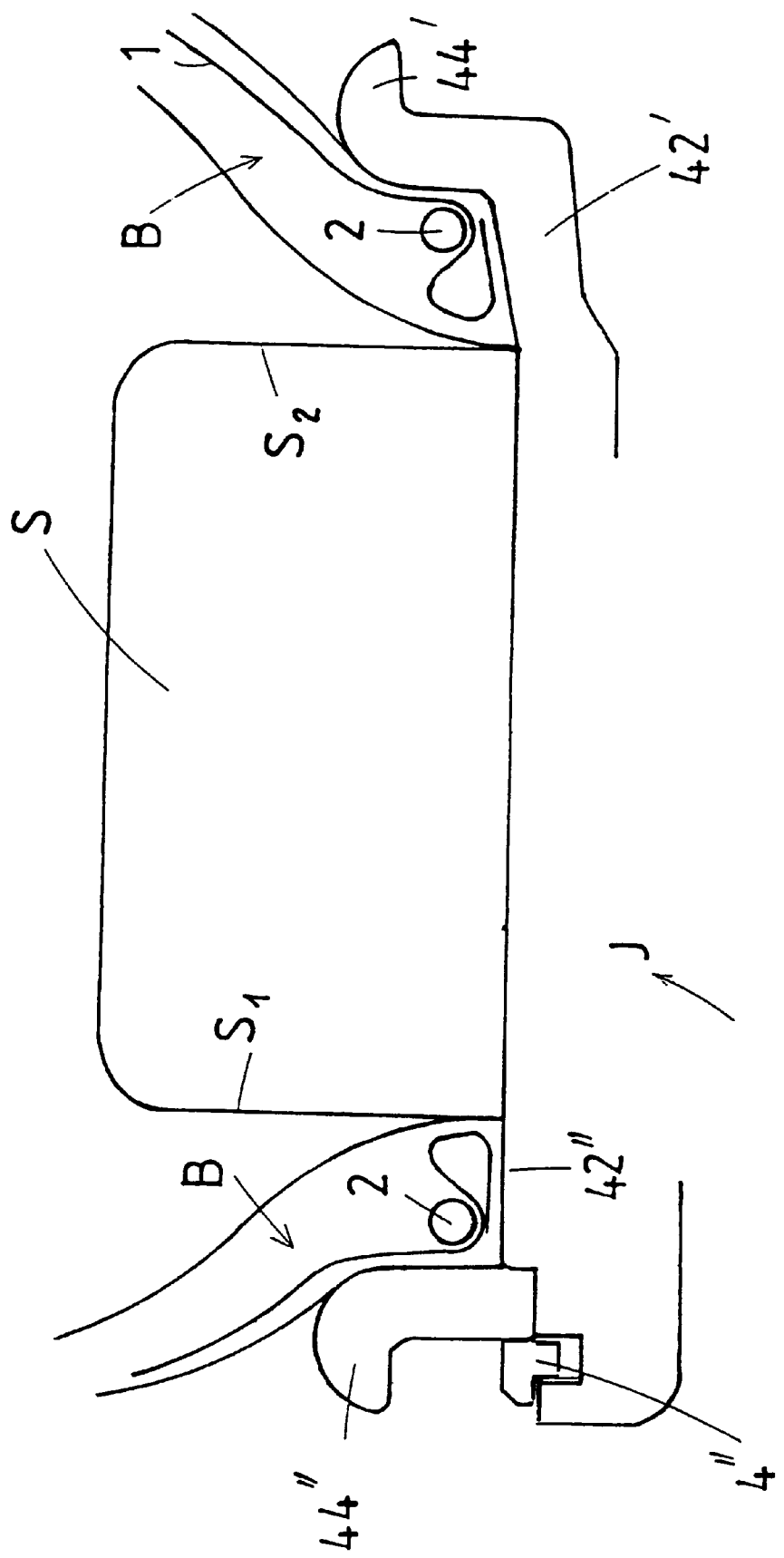
FIG. 7 shows a diagram of an assembly formed by a tire according to the invention, a three-part rim according to a second embodiment, and a bearing support.

The example illustrated in FIG. 7 differs from that of FIG. 6 by the following characteristics: the gasket is dispensed with, the rim seat 42" no longer forms part of the mobile part located on, for instance, the outer side of the assembly, the generatrix of said seat 42" having become parallel to the axis of rotation and said seat 42" then being able to form an integral part of the rim base 40, the rim flange 44" alone remaining mobile. The rim has become asymmetrical owing to the fact that its rim seat 42' has a frustoconical generatrix and that its rim seat 42" has a generatrix parallel to the axis of rotation.

Figure 8:
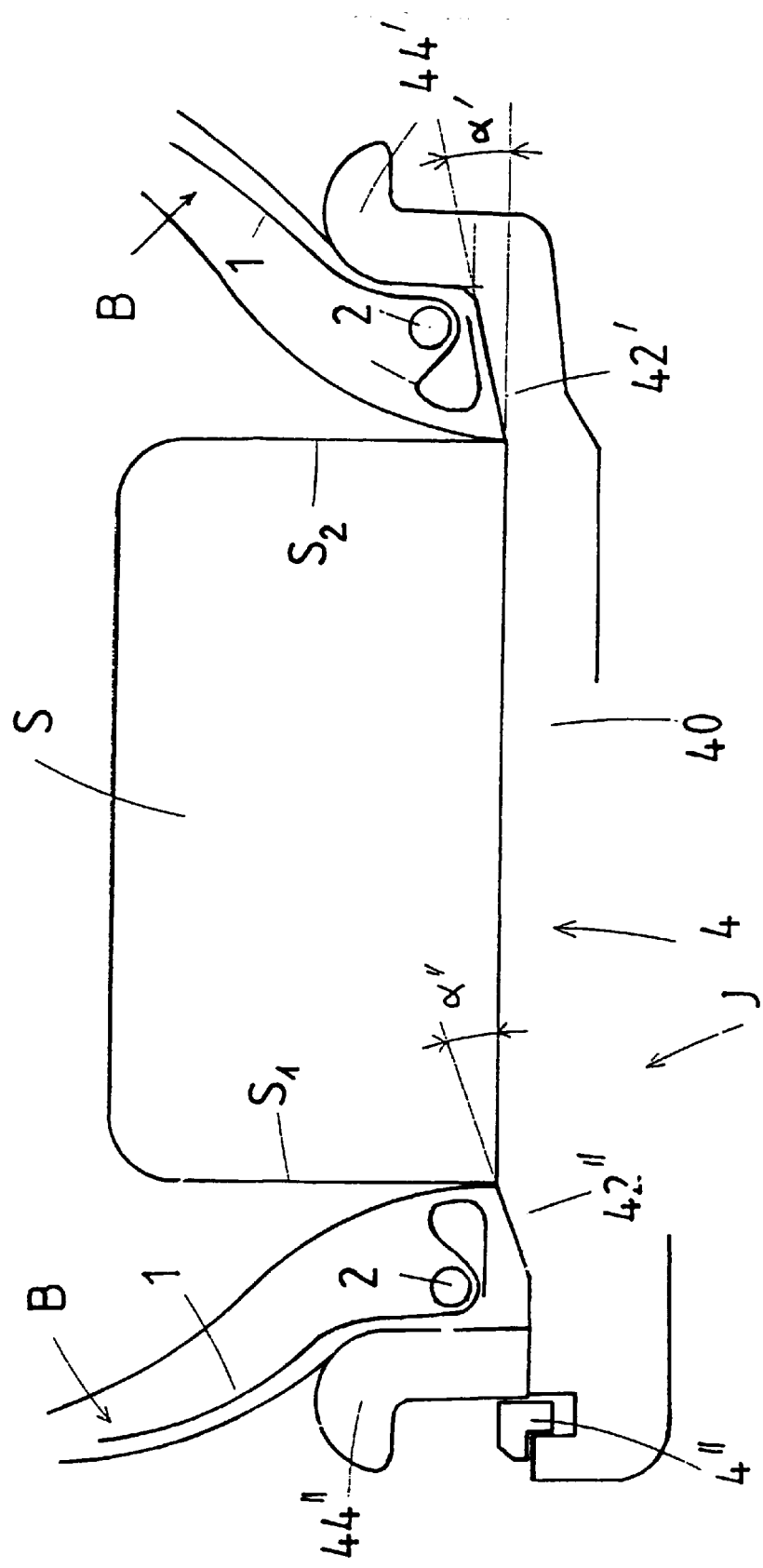
FIG. 8 shows a variant of the assembly as shown in FIG. 7.

The example illustrated in FIG. 8 accentuates this asymmetry, in the sense that the rim seat 42", which still forms an integral part of the rim base 40, has a generatrix formed by a frustoconical portion axially on the inside and over at least 75% of the axial width of the seat, the angle $\alpha''$ of which, with the direction parallel to the axis of rotation, is equal to 5° but open radially towards the outside and axially towards the inside, said frustoconical portion being extended axially on the outside by a cylindrical generatrix. In this example, as in the previous example, the rim seat 42' preserves a frustoconical generatrix forming an angle $\alpha'$ of 5° open radially and axially towards the outside with the direction parallel to the axis of rotation. As in the examples illustrated in FIGS. 6 and 7, the carcass reinforcement 1 winds in each bead about the bead wire 2, passing from the heel to the toe of said bead, and then surrounds in its entirety the profile 3 of rubber mix located axially on the inside of the bead wire 2.

We claim:

1. A tire with radial carcass reinforcement, wound in each bead B on at least one bead wire (2) to form an upturn (10), the radially inner face of each said bead being substantially dimensionally identical to the face of the seat of its intended mounting rim, characterized in that, when mounted on the rim and inflated to its operating pressure, its carcass reinforcement, viewed in meridian section, is wound in at least one of the beads B about a bead wire (2) coated with rubber mix, passing from the heel to the toe of said at least one bead B, the upturn (10) extending in a profile (3) made of rubber mix in the form of a wedge defined by two sides (31 and 32) coming from an apex A located beneath the section of the coated bead wire (2), the radially outer side (31) forming, with a line parallel to the axis of rotation passing through said apex A, an acute angle $\phi_1$ open radially towards the outside, and the radially inner side (32) forming with said parallel line an acute angle $\phi_2$, open radially towards the inside, the rubber mix forming the wedge profile (3), axially adjacent to the coated bead wire (2), having a Shore A hardness of at least 65 and greater than the Shore A hardness of any rubber mixes located axially or radially outside the coated bead wire (2) and the wedge profile (3).

2. A tire according to claim 1, characterized in that the angle $\phi_1$ is between 20° and 70°, whereas the angle $\phi_2$ is between 0° and 30°.

3. A tire according to claim 1, characterized in that the bead wire (2) reinforcing the bead B is surmounted radially on the outside by a substantially triangular profile (7) made of a rubber mix having a Shore A hardness of less than 50, the space, firstly axially adjacent to the substantially triangular profile (7), and secondly radially adjacent to the wedge profile (3) axially adjacent to the coated bead wire (2), being filled by a third profile (6) of rubber mix substantially of triangular shape, said mix also having a Shore A hardness of less than 50.

4. A tire according to claim 1, characterized in that the coated bead wire (2), which has in meridian section a substantially circular section, is capable of being moved in rotation about its mean axis.

5. A tire according to claim 4, characterized in that the coated bead wire (2) is a bead wire which is rigid in torsion, coated with a thin layer of vulcanized rubber mix having a Shore A hardness of at most 35.

6. A tire according to claim 4, characterized in that the coated bead wire (2) is formed of a core around which are wound at least one cord or cable in one or more layers.

7. A tire according to claim 1, characterized in that the carcass reinforcement upturn (10) is substantially rectilinear, has a length substantially equal to the length of the sides (31 and 32) of the wedge profile (3), and forms the radially inner side (32) of the wedge profile (3).

8. A tire according to claim 1, characterized in that the carcass reinforcement upturn (10) is substantially rectilinear, has a length substantially equal to the length of the sides (31 and 32) of the wedge profile (3), and forms the radially outer side (31) of the wedge profile (3).

9. A tire according to claim 1, characterized in that the carcass reinforcement upturn (10) has a length such that it is in contact with the total perimeter of the wedge profile (3) and thus forms the two radially outer and inner sides (31 and 32) of the wedge profile (3) and the lateral side (30) opposite the apex A of said wedge profile (3), the end of said upturn (10) being located axially beyond the apex A.

10. A tire according to claim 9, characterized in that the end of the carcass reinforcement upturn (10) is radially further from the axis of rotation than the center of gravity of the section of the coated bead wire (2).

11. A tire according to claim 1 in which the carcass reinforcement upturn (10) forms the radially inner side (32) of the wedge profile (3) and then the lateral side (30) opposite the apex A of the wedge profile (3) and then the radially outer side (31) of the wedge profile (3).

12. A tire according to claim 1, characterized in that it comprises at least one first bead B, the seat of which is inclined towards the outside, the heel of the bead being axially on the inside, whereas the toe of the bead is axially on the outside, and the carcass reinforcement winding around the coated bead wire (2), passing from the inside to the outside.

13. A tire according to claim 12, characterized in that it comprises a second bead B, symmetrical to the first bead with respect to the equatorial plane of the tire.

14. A tire according to claim 12, characterized in that it comprises a second bead B, the seat of which is inclined towards the inside, the heel of the bead being axially on the outside, whereas the toe of the bead is axially on the inside, and the carcass reinforcement winding around the coated bead wire (2), passing from the outside to the inside.

15. A tire according to claim 1, characterized in that it comprises at least one first bead B, the seat of which is inclined towards the inside, the heel of the bead being axially on the outside, whereas the toe of the bead is axially on the inside, and the carcass reinforcement winding around the coated bead wire (2), passing from the outside to the inside.

16. A tire according to claim 15, characterized in that it comprises a second bead B, symmetrical to the first bead with respect to the equatorial plane of the tire.

17. A tire according to claim 15, characterized in that it comprises a second bead B, the seat of which has a generatrix parallel to the axis of rotation, the heel of this second bead being axially on the outside and the toe of the bead being axially on the inside, the carcass reinforcement winding around the coated bead wire (2), passing from the outside to the inside.

18. A tire according to claim 15, characterized in that it comprises a second head B, the seat of which is inclined towards the outside over at least 75% of its axial width, the heel of this second bead being axially on the outside, whereas the toe of the bead is axially on the inside, and the carcass reinforcement winding around the coated bead wire (2), passing from the outside to the inside.

19. A tire according to claim 1, characterized in that it comprises at least one first bead B, the seat of which has a generatrix parallel to the axis of rotation, the heel of the bead being axially on the outside and the toe of the bead being axially on the inside, and the carcass reinforcement winding around the coated bead wire (2), passing from the outside to the inside.

20. A tire according to claim 1, characterized in that it comprises at least one first bead B, the seat of which is inclined towards the outside over at least 75% of its axial width, the heel of the bead being axially on the outside whereas the toe of the bead is axially on the inside, and the carcass reinforcement winding around the coated bead wire (2), passing from the outside to the inside.

21. An assembly formed of a tire, its intended mounting rim, and a bearing support for the tire tread, said tire mounted on said rim and having a radial carcass reinforcement, wound in each bead B on at least one bead wire (2) to form an upturn (10), the radially inner face of each said bead being substantially dimensionally identical to the face of the seat of said rim, the tire characterized in that, when inflated to its operating pressure, its carcass reinforcement, viewed in meridian section, is wound in at least one of the beads B about a bead wire (2) coated with rubber mix, passing from the heel to the toe of said at least one bead B, the upturn (10) extending in a profile (3) made of rubber mix in the form of a wedge defined by two sides (31 and 32) coming from an apex A located beneath the section of the coated bead wire (2), the radially outer side (31) forming, with a line parallel to the axis of rotation passing through said apex A, an acute angle $\phi_1$ open radially towards the outside, and the radially inner side (32) forming with said parallel line an acute angle $\phi_2$, open radially towards the inside, the rubber mix forming the wedge profile (3), axially adjacent to the coated bead wire (2), having a Shore A hardness of at least 65 and greater than the Shore A hardness of any rubber mixes located axially or radially outside the coated bead wire (2) and the wedge profile (3), said tire comprising a first bead B, the seat of which is inclined towards the outside, the heel of the bead being axially on the inside, whereas the toe of the bead is axially on the outside, and the carcass reinforcement winding around the coated bead wire (2), passing from the inside to the outside, and a second bead B, symmetrical to the first bead with respect to the equatorial plane of the tire, said rim comprising a first rim seat (42) inclined towards the outside, said seat being extended axially on the inside by a rim flange (44) and axially on the outside by a protrusion or hump (41) of low height, and a second rim seat (42) inclined towards the outside, said second seat being extended axially by a rim base (40) on which the bearing support for the tread is placed, one lateral face of which is used as a rim flange, and axially on the outside by a protrusion or Lump (41) of low height.

22. An assembly formed of a tire, its intended mounting rim, and a bearing support for the tire tread, said tire mounted on said rim and having a radial carcass reinforcement, wound in each bead B on at least one bead wire (2) to form an upturn (10), the radially inner face of each said bead being substantially dimensionally identical to the face of the seat of said rim, the tire characterized in that, when inflated to its operating pressure, its carcass reinforcement, viewed in meridian section, is wound in at least one of the beads B about a bead wire (2) coated with rubber mix, passing from the heel to the toe of said at least one bead B, the upturn (10) extending in a profile (3) made of rubber mix in the form of a wedge defined by two sides (31 and 32) coming from an apex A located beneath the section of the coated bead wire (2), the radially outer side (31) forming, with a line parallel to the axis of rotation passing through said apex A, an acute angle $\phi_1$ open radially towards the outside, and the radially inner side (32) forming with said parallel line an acute angle $\phi_2$, open radially towards the inside, the rubber mix forming the wedge profile (3), axially adjacent to the coated bead wire (2), having a Shore A hardness of at least 65 and greater than the Shore A hardness of any rubber mixes located axially or radially outside the coated bead wire (2) and the wedge profile (3), said tire comprising a first bead B, the seat of which is inclined towards the outside, the heel of the bead being axially on the inside, whereas the toe of the bead is axially on the outside, and the carcass reinforcement winding around the coated bead wire (2), passing from the inside to the outside, and a second bead B, the seat of which is inclined towards the inside, the heel of the bead being axially on the outside, whereas the toe of the bead is axially on the inside, and the carcass reinforcement winding around the coated bead wire (2), passing from the outside to the inside, said rim comprising a first rim seat (42') inclined towards the outside, said seat being extended axially on the inside by a rim base (40) on which the bearing support for the tread is placed, one lateral face of which is used as a rim flange, and axially on the outside by a protrusion or hump (41') of low height, and a second rim seat (42") inclined towards the inside, said second rim seat being extended axially on the outside by a rim flange (44) and axially on the inside by a protuberance (41").

23. An assembly formed of a tire, its intended mounting rim, and a bearing support for the tire tread, said tire mounted on said rim and having a radial carcass reinforcement, wound in each bead B on at least one bead wire (2) to form an upturn (10), the radially inner face of each said bead being substantially dimensionally identical to the face of the seat of said rim, the tire characterized in that, when inflated to its operating pressure, its carcass reinforcement, viewed in meridian section, is wound in at least one of the beads B about a bead wire (2) coated with rubber mix, passing from the heel to the toe of said at least one bead B, the upturn (10) extending in a profile (3) made of rubber mix in the form of a wedge defined by two sides (31 and 32) coming from an apex A located beneath the section of the coated bead wire (2), the radially outer side (31) forming, with a line parallel to the axis of rotation passing through said apex A, an acute angle $\phi_1$ open radially towards the outside, and the radially inner side (32) forming with said parallel line an acute angle $\phi_2$, open radially towards the inside, the rubber mix forming the wedge profile (3), axially adjacent to the coated bead wire (2), having a Shore A hardness of at least 65 and greater than the Shore A hardness of any rubber mixes located axially or radially outside the coated bead wire (2) and the wedge profile (3), said tire comprising a first bead B, the seat of which is inclined towards the inside, the heel of the bead being axially on the outside, whereas the toe of the bead is axially on the inside, and the carcass reinforcement winding around the coated bead wire (2), passing from the outside to the inside, and a second bead B, symmetrical to the first bead with respect to the equatorial plane of the tire, said rim formed of three parts, at least two of which are removable, and comprising two rim seats (42', 42") inclined towards the inside, said bearing support for the tread having a maximum axial width in contact with the axially inner walls of the toes of the two beads B of the tire.

24. An assembly formed of a tire, its intended mounting rim, and a bearing support for the tire tread, said tire mounted on said rim and having a radial carcass reinforcement, wound in each bead B on at least one bead wire (2) to form an upturn (10), the radially inner face of each said bead being substantially dimensionally identical to the face of the seat of said rim, the tire characterized in that, when inflated to its operating pressure, its carcass reinforcement, viewed in meridian section, is wound in at least one of the beads B about a bead wire (2) coated with rubber mix, passing from the heel to the toe of said at least one bead B, the upturn (10) extending in a profile (3) made of rubber mix in the form of a wedge defined by two sides (31 and 32) coming from an apex A located beneath the section of the coated bead wire (2), the radially outer side (31) forming, with a line parallel to the axis of rotation passing through said apex A, an acute angle $\phi_1$ open radially towards the outside, and the radially inner side (32) forming with said parallel line an acute angle $\phi_2$, open radially towards the inside, the rubber mix forming the wedge profile (3), axially adjacent to the coated bead wire (2), having a Shore A hardness of at least 65 and greater than the Shore A hardness of any rubber mixes located axially or radially outside the coated bead wire (2) and the wedge profile (3), said tire comprising a first bead B, the seat of which is inclined towards the inside, the heel of the bead being axially on the outside, whereas the toe of the bead is axially on the inside, and the carcass reinforcement winding around the coated bead wire (2), passing from the outside to the inside, and a second bead B, the seat of which has a generatrix parallel to the axis of rotation, the heel of the bead being axially on the outside and the toe of the bead being axially on the inside, the carcass reinforcement winding around the coated bead wire (2), passing from the outside to the inside, said rim formed of three parts, at least two of which are removable, and comprising a first rim seat (42') inclined towards the inside, said seat being extended axially on the outside by a rim flange (44'), and a second rim seat (42"), the generatrix of which is parallel to the axis of rotation, said second rim seat being extended axially by a second rim flange (44"), said bearing support for the tread having a maximum axial width in contact with the axially inner walls of the toes of the two beads B of the tire.

25. An assembly formed of a tire, its intended mounting rim, and a bearing support for the tire tread, said tire mounted on said rim and having a radial carcass reinforcement, wound in each bead B on at least one bead wire (2) to form an upturn (10), the radially inner face of each said bead being substantially dimensionally identical to the face of the seat of said rim, the tire characterized in that, when inflated to its operating pressure, its carcass reinforcement, viewed in meridian section, is wound in at least one of the beads B about a bead wire (2) coated with rubber mix, passing from the heel to the toe of said at least one bead B, the upturn (10) extending in a profile (3) made of rubber mix in the form of a wedge defined by two sides (31 and 32) coming from an apex A located beneath the section of the coated bead wire (2), the radially outer side (31) forming, with a line parallel to the axis of rotation passing through said apex A, an acute angle $\phi_1$ open radially towards the outside, and the radially inner side (32) forming with said parallel line an acute angle $\phi_2$, open radially towards the inside, the rubber mix forming the wedge profile (3), axially adjacent to the coated bead wire (2), having a Shore A hardness of at least 65 and greater than the Shore A hardness of any rubber mixes located axially or radially outside the coated bead wire (2) and the wedge profile (3), said tire comprising a first bead B, the seat of which is inclined towards the inside, the heel of the bead being axially on the outside, whereas the toe of the bead is axially on the inside, and the carcass reinforcement winding around the coated bead wire (2), passing from the outside to the inside, and a second bead B, the seat of which is inclined towards the outside over at least 75% of its axial width, the heel of the bead being axially on the outside and the toe of the bead being axially on the inside, the carcass reinforcement winding around the coated bead wire (2), passing from the outside to the inside, said rim formed of three parts, at least two of which are removable, and comprising a first rim seat (42") inclined towards the inside, said seat being extended axially on the outside by a rim flange (44'), and a second rim seat (42') inclined towards the outside over at least 75% of its axial width, said second rim seat being extended axially on the outside by a rim flange (44"), said bearing support for the tread having a maximum axial width in contact with the axially inner walls of the toes of the two beads B of the tire.

* * * * *

UNITED STATES PATENT AND TRADEMARK OFFICE
CERTIFICATE OF CORRECTION

PATENT NO. : 5,971,047

DATED : October 26, 1999

INVENTOR(S) : Jean-Jacques Drieux et al.

It is certified that error appears in the above-identified patent and that said Letters Patent is hereby corrected as shown below:

IN THE CLAIMS:

Column 10, line 48, "head" should read --bead--;

Column 11, line 42, "Lump" should read --hump--.

Signed and Sealed this

Twenty-seventh Day of March, 2001

NICHOLAS P. GODICI

*Attest:*

*Attesting Officer*     Acting Director of the United States Patent and Trademark Office